(12) United States Patent
Schulz et al.

(10) Patent No.: US 10,732,395 B2
(45) Date of Patent: Aug. 4, 2020

(54) IMMERSION OBJECTIVE LENS FOR A MICROSCOPE

(71) Applicant: Leica Microsystems CMS GmbH, Wetzlar (DE)

(72) Inventors: Christian Schulz, Solms-Albshausen (DE); Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 15/956,788

(22) Filed: Apr. 19, 2018

(65) Prior Publication Data
US 2018/0307021 A1    Oct. 25, 2018

(30) Foreign Application Priority Data
Apr. 21, 2017  (DE) ......................... 10 2017 108 595

(51) Int. Cl.
*G02B 21/02*    (2006.01)
*G02B 7/10*    (2006.01)
(Continued)

(52) U.S. Cl.
CPC ............. *G02B 21/025* (2013.01); *G02B 7/10* (2013.01); *G02B 9/34* (2013.01); *G02B 21/02* (2013.01);
(Continued)

(58) Field of Classification Search
CPC .. G02B 21/00; G02B 21/0016; G02B 21/002; G02B 21/0024; G02B 21/02; G02B 21/025; G02B 21/33; G02B 27/00; G02B 27/0025; G02B 27/005; G02B 27/0068; G02B 2027/011; G02B 2027/0116; G02B 27/0037; G02B 9/34
See application file for complete search history.

(56) References Cited

U.S. PATENT DOCUMENTS 5,270,860 A * 12/1993 Suzuki ............... G02B 27/0068
359/656
5,659,425 A * 8/1997 Suzuki ................... G02B 21/02
359/656

(Continued)

FOREIGN PATENT DOCUMENTS

DE    102004051357 A1    4/2006

*Primary Examiner* — Thong Q Nguyen
(74) *Attorney, Agent, or Firm* — Leydig, Voit & Mayer, Ltd.

(57) ABSTRACT

An immersion objective lens for a microscope includes a first lens group having positive refractive power, a second lens group having positive refractive power, a third lens group having negative refractive power and a fourth lens group having positive refractive power disposed in this sequence from the object side. The second lens group is moveable along an optical axis so as to achieve a corrective effect with respect to a spherical aberration, such that a sum of a distance between the second lens group and the first lens group and of a distance between the second lens group and the third lens group is constant. The corrective effect of the second lens group is predetermined such that the spherical aberration is minimized for a light incidence that corresponds to a mean numerical aperture that lies between zero and a nominal aperture of the immersion objective lens.

15 Claims, 3 Drawing Sheets

(51) Int. Cl.
*G02B 9/34* (2006.01)
*G02B 27/00* (2006.01)

(52) U.S. Cl.
CPC ..... *G02B 27/0025* (2013.01); *G02B 27/0037* (2013.01)

(56) References Cited

U.S. PATENT DOCUMENTS

| | | | |
|---|---|---|---|
| 5,940,220 A | 8/1999 | Suenaga et al. | |
| 7,133,212 B2* | 11/2006 | Wartmann | G02B 21/02 |
| | | | 359/656 |
| 7,215,478 B1* | 5/2007 | Hirata | G02B 21/33 |
| | | | 359/656 |
| 7,869,132 B2* | 1/2011 | Saito | G02B 9/60 |
| | | | 359/368 |
| 8,705,178 B2 | 4/2014 | Fujita | |
| 2006/0087745 A1 | 4/2006 | Fahlbusch et al. | |

* cited by examiner

IMMERSION OBJECTIVE LENS FOR A MICROSCOPE

CROSS-REFERENCE TO PRIOR APPLICATIONS

Priority is claimed to German Patent Application No. DE 10 2017 108 595.5, filed on Apr. 21, 2017, the entire disclosure of which is hereby incorporated by reference herein.

FIELD

The invention relates to an immersion objective lens for a microscope, comprising a first lens group having positive refractive power, a second lens group having positive refractive power, a third lens group having negative refractive power and a fourth lens group having positive refractive power that are arranged in this sequence from an object side, it being possible to move the second lens group along the optical axis, in order to achieve a corrective effect with respect to the spherical aberration, such that the sum of the distance between the second lens group and the first lens group and of the distance between the second lens group and the third lens group is constant.

BACKGROUND

Certain immersion objective lenses for microscopes that enable an operator to correct aberrations resulting from changing optical characteristics of the specimen chamber are known from the prior art. These aberrations include spherical aberration, for example, which occurs as a result of variations in the density of the immersion fluid used or inhomogeneities in the biological structure of the specimen to be observed. Particularly in the case of objective lenses having a high numerical aperture, at a large working distance and with large refractive index contrasts in the beam path between objective lens and specimen, substantial spherical aberration often occurs.

U.S. Pat. No. 8,705,178 B2 discloses an objective lens for a microscope that comprises a first lens group having positive refractive power, a second lens group having positive refractive power, a third lens group having negative refractive power and a fourth lens group having positive refractive power that are arranged in this sequence from an object side. The second lens group constitutes a correction member that can be moved along an optical axis in order to correct the spherical aberration. The second lens group has a refractive power that is approximately equal to or greater than the total refractive power of the objective lens. However, this objective lens is not suitable for use as an immersion objective lens.

Another objective lens that also has only one correction member that can be moved along the optical axis is known from U.S. Pat. No. 5,940,220. Compared to the previously mentioned objective lens, the refractive power of the correction member that can be moved along the optical axis is small in relation to the total refractive power of the objective lens. A corrective effect results from the position of the correction member within a divergent or convergent beam path, which can be varied by moving the correction member. The relatively low refractive power of the correction member has the disadvantage that the objective lens must have a long overall length in order to achieve a great corrective effect, and the diameter of the objective lens increases with the overall length, which is disadvantageous in many microscopy applications.

Finally, an immersion objective lens is known from DE 10 2004 051 357 A1 in which a plurality of lens groups are moved in order to correct spherical aberration. This construction is characterized by a high level of mechanical complexity, which is associated with high production costs and frequent need for repairs.

SUMMARY

In an embodiment, the present invention provides an immersion objective lens for a microscope. The immersion objective lens includes a first lens group having positive refractive power, a second lens group having positive refractive power disposed in sequence to the first lens group from an object side, a third lens group having negative refractive power disposed in sequence to the second lens group from the object side and a fourth lens group having positive refractive power disposed in sequence to the third lens group from the object side. The second lens group is moveable along an optical axis so as to achieve a corrective effect with respect to a spherical aberration, such that a sum of a distance between the second lens group and the first lens group and of a distance between the second lens group and the third lens group is constant. The corrective effect of the second lens group is predetermined such that the spherical aberration is minimized for a light incidence that corresponds to a mean numerical aperture that lies between zero and a nominal aperture of the immersion objective lens.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
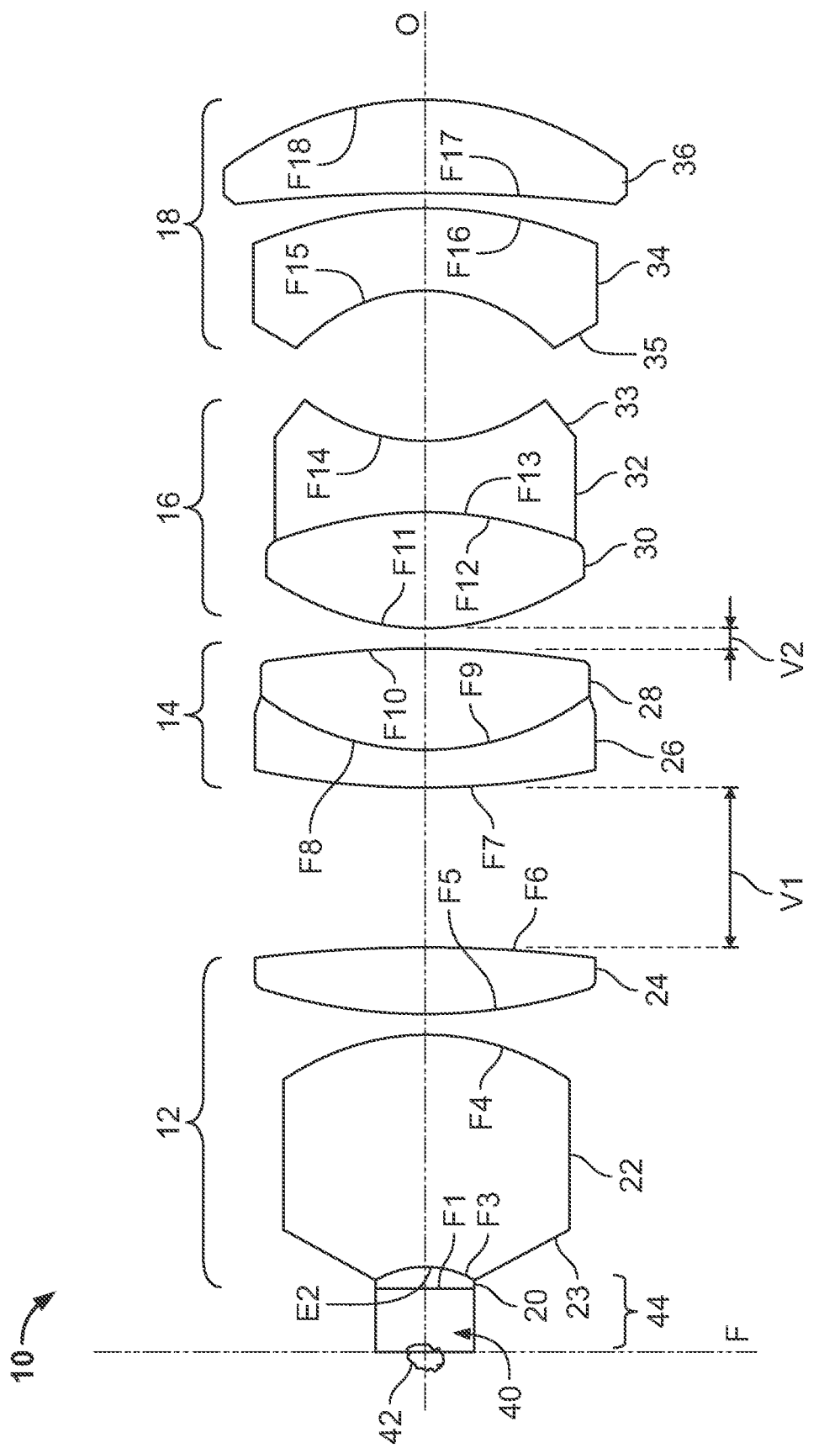
FIG. 1 is a schematic sectional view of an embodiment of an immersion objective lens.

In contrast to the prior art, an embodiment of the invention provides a simply and compactly designed immersion objective lens that allows an operator to reliably correct spherical aberration.

According to an embodiment, this is achieved by an immersion objective lens for a microscope, comprising a first lens group having positive refractive power, a second lens group having positive refractive power, a third lens group having negative refractive power and a fourth lens group having positive refractive power that are arranged in this sequence from an object side, it being possible to move the second lens group along the optical axis, in order to achieve a corrective effect with respect to the spherical aberration, such that the sum of the distance between the second lens group and the first lens group and of the distance between the second lens group and the third lens group is constant, and the corrective effect of the second lens group being predetermined such that the spherical aberration is minimized for a light incidence that corresponds to a mean numerical aperture that lies between zero and a nominal aperture of the immersion objective lens.

The aforementioned requirement for the corrective effect of the second lens group means that in the immersion objective lens according to an embodiment of the invention, the image-side back focal length of a light beam that is incident into the immersion objective lens at an aperture angle in relation to the optical axis or at a level above the optical axis that corresponds to a mean numerical aperture between zero and the nominal aperture of the immersion objective lens remains substantially unchanged if the second lens group is moved along the optical axis in order to correct the spherical aberration. The nominal aperture of the immersion objective lens defines the maximum numerical aperture. The abovementioned requirement ensures that when the second lens group is moved, the position of the paraxial focus changes such that the best plane of focus—that is, the best-conveyed focal position in consideration of any spherical aberration that may still be present—remains unchanged. In particular, this means that the point spread function (PSF) of the immersion objective lens remains substantially stationary during the adjustment of the second lens group. The immersion objective lens according to the invention is therefore well suited particularly for confocal microscopy. Furthermore, the immersion objective lens according to an embodiment of the invention is well suited for use in lightsheet microscopy, since a previously existing coplanarity of the detection plane defined by the immersion objective lens according to the invention persists with lightsheet illumination during the adjustment of the second lens group.

In a preferred embodiment, the mean numerical aperture lies in an aperture range between 0.65 times and 0.75 times the nominal aperture of the immersion objective lens. This range has proven to be advantageous particularly for use in confocal microscopy.

In a preferred embodiment, the refractive power $D_2$ of the second lens group is at least one tenth and at most one third of the total refractive power D of the objective lens:

$$\tfrac{1}{10}\,D < D_2 < \tfrac{1}{3}\,D.$$

For one thing, the refractive power of the second lens group is therefore so small in relation to the total refractive power that its influence on the position of the PSF is largely negligible. For another, the refractive power of the second lens group is sufficiently great that a compact construction, particularly a short overall length of the objective lens, is achieved with adequate corrective effect.

In a preferred embodiment, the first lens group contains a first lens having positive refractive power, a second lens having negative refractive power and a third lens having positive refractive power that are arranged in this sequence from the object side, with the first lens being cemented to the second lens.

In a particularly preferred embodiment, the first lens is a plano-convex lens, whereas the second lens is a meniscus lens and the third lens is a biconvex lens.

In a preferred embodiment, the second lens group contains a fourth lens having negative refractive power and a fifth lens having positive refractive power that are cemented together.

In an advantageous embodiment, the fourth lens is a meniscus lens and the fifth lens is a biconvex lens.

In another preferred embodiment, the third lens group contains a sixth lens having positive refractive power, preferably a biconvex lens, and a seventh lens having negative refractive power, preferably a biconcave lens, that are arranged in this sequence from the object side and cemented together. By virtue of the design as a cemented component, the third lens group can be particularly embodied as an achromat in order to correct chromatic aberration.

In another preferred embodiment, the fourth lens group comprises an eighth lens having negative refractive power and a ninth lens having positive refractive power that are arranged in this sequence from the object side. In a particularly preferred embodiment, the eighth and the ninth lenses are each embodied as a meniscus lens.

In an advantageous development, the immersion objective lens has a manually operable drive with the aid of which the second lens group can be moved along the optical axis. The manual drive is formed by a knurled ring, for example, the rotation of which is converted by means of a gear mechanism into a longitudinal movement of the second lens group.

In another advantageous development, the immersion objective lens has a motor-operated drive with the aid of which the second lens group can be moved in a motor-driven manner along the optical axis. For example, the drive comprises a motor that moves a cam element via a gear mechanism. In an alternative embodiment of the drive, the second lens group can also be moved in a motor-driven manner by means of a threaded spindle and a threaded nut or by means of a gear rack.

The invention also provides for a microscope, particularly a confocal microscope, a multiphoton microscope, or a lightsheet microscope, comprising an immersion objective lens of the type described above.

FIG. 1 shows, as one possible embodiment, an immersion objective lens 10 in a section along the optical axis O.

The immersion objective lens 10 is facing toward a specimen chamber 44 in which a specimen 42 is arranged. An immersion fluid 40 such as water, glycerin, or a special immersion oil is located in the specimen chamber 44.

The immersion objective lens 10 comprises a first lens group 12 having positive refractive power, a second lens group 14 having positive refractive power, a third lens group 16 having negative refractive power and a fourth lens group 18 having positive refractive power that are arranged in this sequence from the specimen 42, i.e. from the object side. Only the second lens group 14 is designed so as to be movable for the purpose of correcting spherical aberration; in other words, the first lens group 12, the third lens group 16 and the fourth lens group 18 are stationary.

When seen from the object side, the first lens group 12 comprises a first lens 20 having positive refractive power with an object-side planar surface F1 and an image-side convex surface F2, a second lens 22 having negative refractive power with an object-side concave surface F3 and an image-side convex surface F4, and a third lens 24 having positive refractive power with two convex surfaces F5 and F6, with the convex surface F2 of the first lens 20 and concave surface F3 of the second lens 22 being cemented together. The second lens 22 has a bevel 23 on the object side.

Seen from the object side, the second lens group 14 comprises a fourth lens 26 having negative refractive power, a convex surface F7 on the object side and a concave surface F8 on the image side, and a fifth lens 28 having positive refractive power comprising two convex surfaces F9 and F10, with the concave surface F8 of the fourth lens 26 and the object-side surface F9 of the fifth lens 28 being cemented together. The second lens group 14 thus forms a single cemented component. The embodiment of the second lens group 14 as a cemented component results in a compact objective lens construction, since only a single lens component needs to be moved in order to correct the spherical aberration.

Seen from the object side, the third lens group 16 comprises a sixth lens 30 having positive refractive power comprising two convex surfaces F11 and F12, and a seventh lens 32 having negative refractive power, with the image-side surface F12 of the sixth lens 30 and the object-side surface F13 of the seventh lens 32 being cemented together. The biconcave lens 32 has a bevel 33 on the image side.

Seen from the object side, the fourth lens group 18 comprises an eighth lens 34 having negative refractive power that has a concave surface F15 on the object side and a convex surface F16 on the image side, and a ninth lens 36 having positive refractive power that has a concave surface F17 on the object side and a convex surface F18 on the image side. In the embodiment shown in FIG. 1, the eighth lens 34 has a bevel 35 on the image side.

Table 1 shows lens data for the objective lens 10 according to FIG. 1. The radius of curvature of the respective lens surface and the distance to the following surface are indicated in mm. Moreover, the refractive index $n_e$ and Abbe number $v_e$ of the slides used at a wavelength of 546.073 nm are indicated in Table 1. The surfaces are numbered starting from the object side. In addition, the reference symbols used in FIG. 1 are listed.

Since the second lens group 14 can be moved along the optical axis O, the distances between the lens surfaces F6 and F7 as well as between lens surfaces F10 and F11 are variable. They are designated in FIG. 1 and Table 1 by V1 and V2 respectively. Their sum is constant and is 7.33 mm in the depicted embodiment.

TABLE 1

| Surface | Reference symbols | Radius | Distance | $n_e$ | $v_e$ |
|---|---|---|---|---|---|
| 1 | F | infinite | 2.5558 | 1.33447 | 55.8 |
| 2 | F1 | infinite | 0.8600 | 1.46008 | 67.7 |
| 3 | F2, F3 | −4.0200 | 9.3800 | 1.80811 | 46.3 |
| 4 | F4 | −10.1460 | 0.8300 | | |
| 5 | F5 | 21.3260 | 2.7000 | 1.59447 | 68.2 |
| 6 | F6 | −58.8390 | V1 | | |
| 7 | F7 | 35.3510 | 1.5200 | 1.64133 | 42.2 |
| 8 | F8, F9 | 11.1920 | 4.1500 | 1.49845 | 81.1 |
| 9 | F10 | −37.3430 | V2 | | |
| 10 | F11 | 10.9490 | 4.7400 | 1.53019 | 76.6 |
| 11 | F12, F13 | −16.3020 | 2.9100 | 1.64133 | 42.2 |
| 12 | F14 | 8.0360 | 6.1500 | | |
| 13 | F15 | −7.0030 | 3.3600 | 1.51872 | 64.0 |
| 14 | F16 | −17.4230 | 0.5800 | | |
| 15 | F17 | −71.8600 | 3.8800 | 1.62033 | 63.1 |
| 16 | F18 | −13.2430 | | | |

By moving the second lens group 14 along the optical axis O—by actuating a knurled ring, for example—an operator is able to correct aberrations, particularly spherical aberration, that occur due to changing optical properties within the specimen chamber 44. These aberrations can be caused particularly by variations in the density of the immersion fluid 40 used or inhomogeneities in the biological structure of the specimen 42.

The refractive power $D_2$ of the second lens group 14 is at least one tenth and at most one third of the total refractive power D of the immersion objective lens 10. In order to achieve a compact construction, particularly a short overall length, of the immersion objective lens 10 with great corrective effect, a high refractive power of the second lens group 14 near the abovementioned maximum value is advantageous.

The distances V1, V2 between the first lens group 12 and the second lens group 14 as well as between the second lens group 14 and the third lens group 16 can be adapted by an operator, particularly depending on the immersion fluid 40 that is used. In the depicted embodiment, when water is used as an immersion fluid 40, the optimal correction state is achieved with the values V1=6.53 mm and V2=0.80 mm. If glycerin is used as an immersion fluid 40, then the values turn out to be V1=5.81 mm and V2=1.52 mm. For the sake of example, Table 1 lists the values when water is used as an immersion fluid 40.

Figure 2:
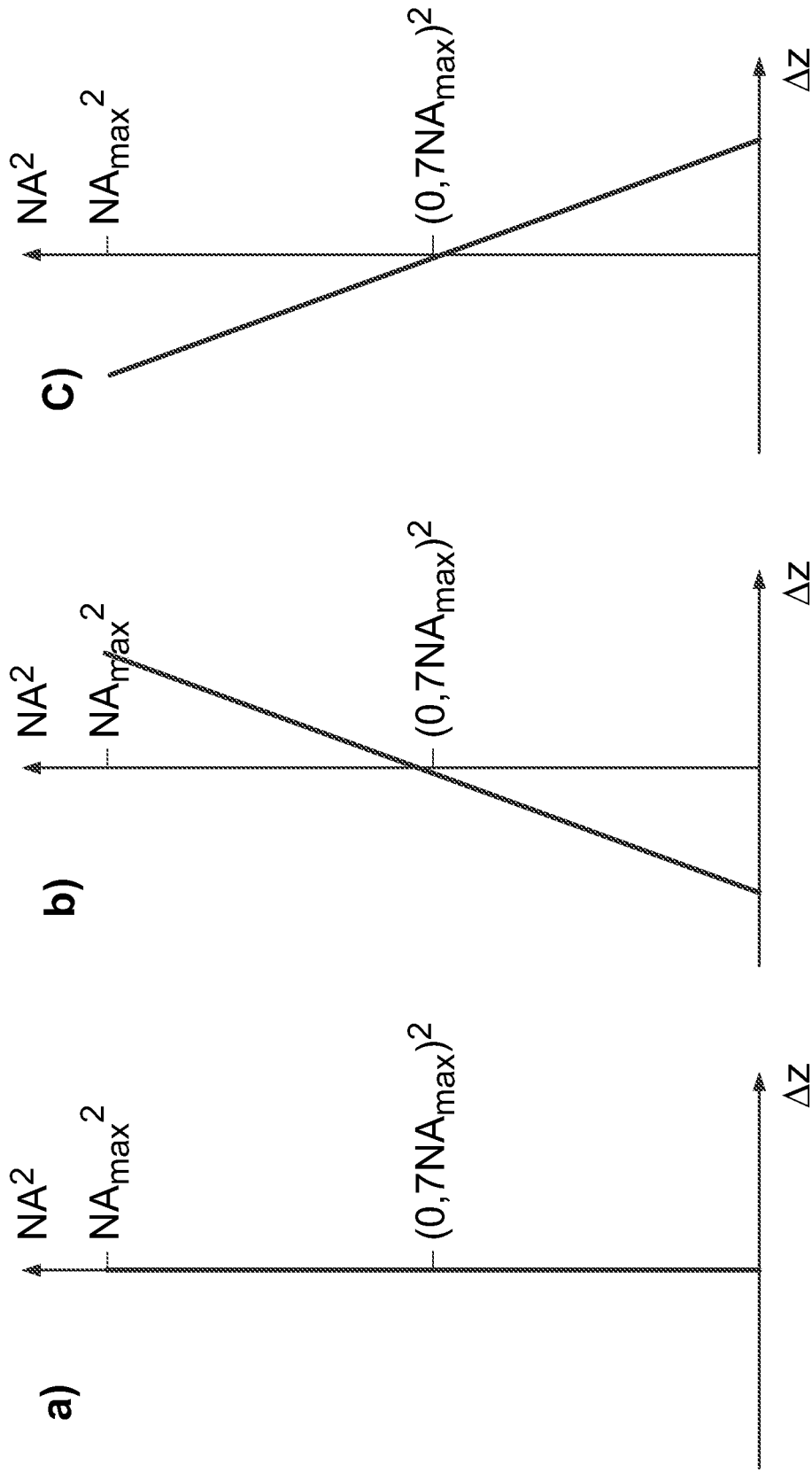
FIG. 2 shows the spherical aberration of a light beam that is incident into the immersion objective lens according to FIG. 1 as a function of the numerical aperture for various correction settings.

FIG. 2 is a schematic representation of the spherical aberration of the immersion objective lens 10—characterized by a quantity $\Delta z$—as a function of the numerical aperture NA, particularly as a function of the square of NA, for different correction settings of the second lens group 14. The quantity $\Delta z$ specifically indicates the deviation of the image-side back focal length from the paraxial image point.

Subfigure a) shows the spherical aberration $\Delta z$ of the immersion objective lens 10 for an optimal position of the second lens group 14—that is, for a position of the second lens group 14 in which the spherical aberration is corrected to the greatest possible extent.

Subfigure b) shows the spherical aberration $\Delta z$ of the immersion objective lens 10 for a position of the second lens group 14 on the image side of the optimal position. In the embodiment that is shown, areas with a small numerical aperture are overcorrected in this position. Areas having a high numerical aperture near the nominal aperture of the immersion objective lens 10 are undercorrected.

Subfigure c) shows the spherical aberration $\Delta z$ of the immersion objective lens 10 for a position of the second lens group 14 on the object side of the optimal position. Unlike the setting according to subfigure b), areas having a low numerical aperture are undercorrected here, whereas areas having a high numerical aperture near the nominal aperture of the immersion objective lens 10 are overcorrected.

According to the invention, the spherical aberration $\Delta z$ for a mean numerical aperture NA that lies in an aperture range between zero and the nominal aperture of the immersion objective lens 10 is minimized. In the depicted embodiment, the selected numerical aperture is 0.7 times the nominal aperture of the immersion objective lens 10.

Figure 3:
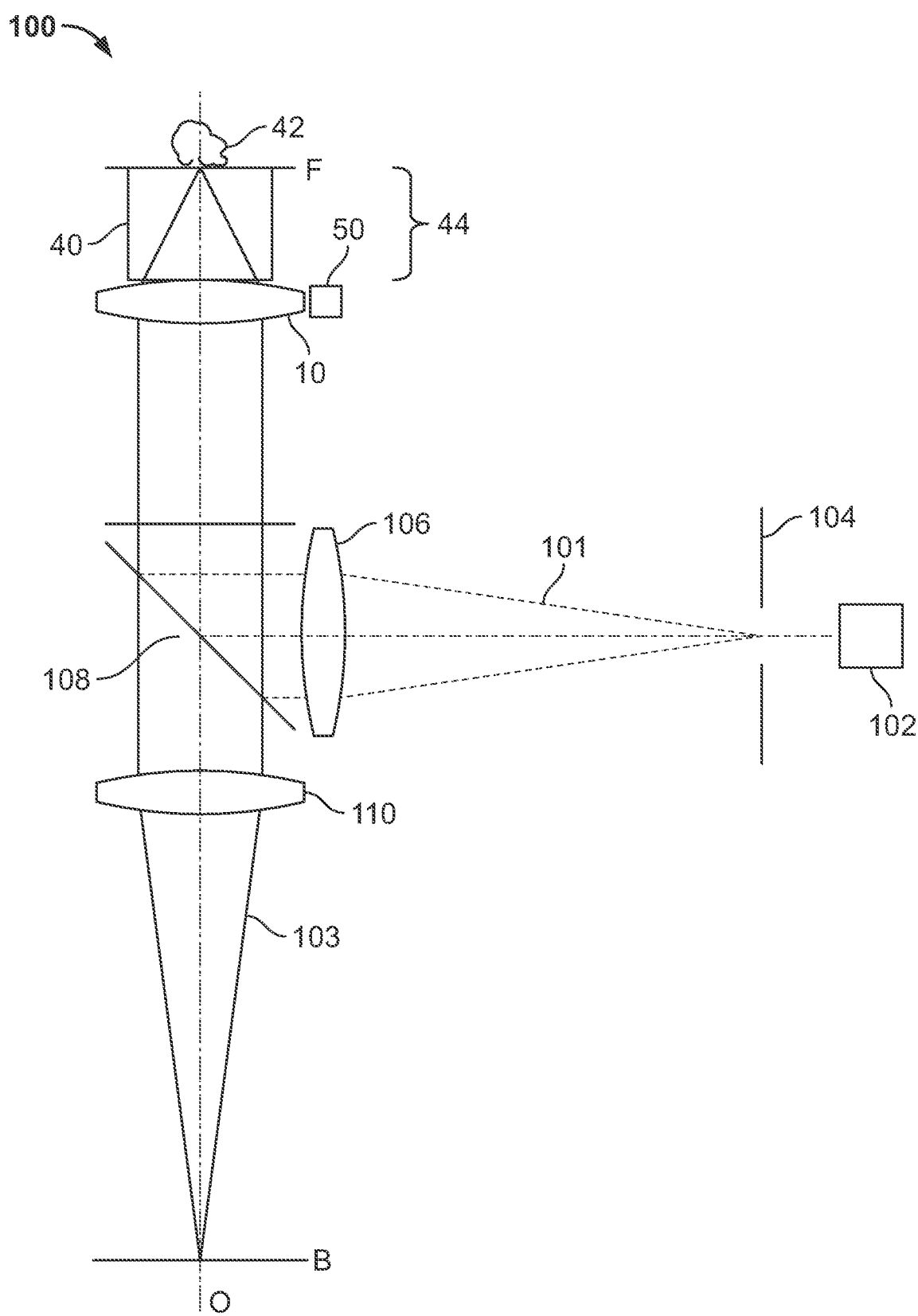
FIG. 3 is a schematic representation of an embodiment of a microscope that comprises the immersion objective lens according to FIG. 1.

FIG. 3 is a schematic representation of an embodiment of a microscope 100 that comprises the immersion objective lens 10 according to FIG. 1.

A light source 102, a field diaphragm 104, an illuminating lens 106, a dichroic beam splitter 108, the immersion objective lens 10 and the immersion fluid 40 are arranged in an illumination beam path 101 of the microscope 100. The light source 102 emits illumination light, which can be particularly light that excites the specimen 42 such that said specimen emits fluorescent light. The illumination light is spatially delimited by the field diaphragm 104 and, after passing through the illuminating lens 106, strikes the dichroic beam splitter 108. The dichroic beam splitter 108 is arranged such that it directs the illumination light to the immersion objective lens 10. After passing through the immersion objective lens 10 and through the immersion fluid 40, the illumination light reaches the specimen 42.

Starting from the object side, the immersion fluid 40, the immersion objective lens 10, the dichroic beam splitter 108 and a tube lens 110 are arranged in a detection beam path 103 of the microscope 100. The specimen 42 that is arranged on a focal plane F of the immersion objective lens 10 emits detection light, which can in particular be fluorescent light. After passing through the immersion fluid 40 and the immersion objective lens 10, the detection light strikes the dichroic beam splitter 108, which transmits the detection light. After passing through the beam splitter 108, the detection light is incident in the tube lens 110, which bundles the detection light onto an image plane B on which an image of the specimen 42 is thus produced.

A drive that is designated generally with 50 is arranged on the immersion objective lens 10. The drive 50 allows an operator to correct aberrations, particularly spherical aberration. For example, the drive 50 can be a knurled ring the rotation of which by means of a gear mechanism is converted into a movement of the second lens group 14 forming the correction member of the immersion objective lens 10 along the optical axis O in order to achieve the desired corrective effect. Alternatively, the second lens group 14 can be moved in a motor-driven manner by the drive 50. For this purpose, the drive 50 comprises a motor, for example, that moves a cam element via a gear mechanism in order to displace the second lens group 14 along the optical axis O. Alternatively, the second lens group 14 can also be moved in a motor-driven manner by means of a threaded spindle and a threaded nut or by means of a gear rack.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 10 immersion objective lens
12 first lens group
14 second lens group
16 third lens group
18 fourth lens group
20, 24, 26, 28, 30, 32, 34, 36 lenses
23, 33, 35 bevels
40 immersion fluid
42 specimen
44 specimen chamber
F1-F18 lens surfaces
50 drive
100 microscope
101 illumination beam path
102 light source
103 detection beam path
104 field diaphragm
106 illuminating lens
108 dichroic beam splitter
110 tube lens
B image plane
F focal plane
O optical axis

What is claimed is:

1. An immersion objective lens for a microscope, the immersion objective lens comprising:
    a first lens group having positive refractive power;
    a second lens group having positive refractive power disposed in sequence to the first lens group from an object side;
    a third lens group having negative refractive power disposed in sequence to the second lens group from the object side; and
    a fourth lens group having positive refractive power disposed in sequence to the third lens group from the object side,
    wherein the second lens group is moveable along an optical axis so as to achieve a corrective effect with respect to a spherical aberration, such that a sum of a distance between the second lens group and the first lens group and of a distance between the second lens group and the third lens group is constant, the corrective effect of the second lens group being predetermined such that the spherical aberration is minimized for a light incidence that corresponds to a mean numerical aperture that lies between zero and a nominal aperture of the immersion objective lens, and
    wherein the refractive power of the second lens group is at least one tenth and no more than one third of a total refractive power of the immersion objective lens.

2. The immersion objective lens for a microscope according to claim 1, wherein the mean numerical aperture lies in an aperture range between 0.65 times and 0.75 times the nominal aperture of the immersion objective lens.

3. The immersion objective lens for a microscope according to claim 1, wherein the first lens group includes a first lens having positive refractive power, a second lens having negative refractive power disposed in sequence to the first lens from the object side and a third lens having positive refractive power disposed in sequence to the second lens from the object side, and wherein the first lens is cemented to the second lens.

4. The immersion objective lens for a microscope according to claim 3, wherein the first lens is a plano-convex lens, the second lens is a meniscus lens, and the third lens is a biconvex lens.

5. The immersion objective lens for a microscope according to claim 1, wherein the second lens group includes a fourth lens having negative refractive power and a fifth lens having positive refractive power that are cemented together.

6. The immersion objective lens for a microscope according to claim 5, wherein the fourth lens is a meniscus lens and the fifth lens is a biconvex lens.

7. The immersion objective lens for a microscope according to claim 1, wherein the third lens group includes a sixth lens having positive refractive power and a seventh lens having negative refractive power disposed in sequence to the sixth lens sequence from the object side, and wherein the sixth and seventh lenses are cemented together.

8. The immersion objective lens for a microscope according to claim 7, wherein the sixth lens is a biconvex lens and the seventh lens is a biconcave lens.

9. The immersion objective lens for a microscope according to claim 1, wherein the fourth lens group includes an eighth lens having negative refractive power and a ninth lens having positive refractive power disposed in sequence to the eighth lens from the object side.

10. The immersion objective lens for a microscope according to claim 9, wherein the eighth lens and the ninth lens are each embodied as a meniscus lens.

11. The immersion objective lens for a microscope according to claim 1, further comprising a manually operable drive, the second lens group being moveable along the optical axis using the manually operably drive.

12. The immersion objective lens for a microscope according to claim 1, further comprising a motor-driven drive, the second lens group being moveable along the optical axis using the motor-driven drive.

13. A microscope having an immersion objective lens according to claim 1.

14. The microscope according to claim 13, wherein the microscope is a confocal microscope, multiphoton microscope or lightsheet microscope.

15. An immersion objective lens for a microscope, the immersion objective lens comprising:
a first lens group having positive refractive power, the first lens group including a first lens having positive refractive power, a second lens having negative refractive power disposed in sequence to the first lens from the object side and a third lens having positive refractive power disposed in sequence to the second lens from the object side, the first lens being cemented to the second lens, the first lens being a plano-convex lens, the second lens being a meniscus lens, and the third lens being a biconvex lens;
a second lens group having positive refractive power disposed in sequence to the first lens group from an object side;
a third lens group having negative refractive power disposed in sequence to the second lens group from the object side; and
a fourth lens group having positive refractive power disposed in sequence to the third lens group from the object side,
wherein the second lens group is moveable along an optical axis so as to achieve a corrective effect with respect to a spherical aberration, such that a sum of a distance between the second lens group and the first lens group and of a distance between the second lens group and the third lens group is constant, the corrective effect of the second lens group being predetermined such that the spherical aberration is minimized for a light incidence that corresponds to a mean numerical aperture that lies between zero and a nominal aperture of the immersion objective lens.

* * * * *